United States Patent [19]

Schreiner et al.

[11] Patent Number: 4,487,296

[45] Date of Patent: Dec. 11, 1984

[54] WIRE SPRING FOR A DISC BRAKE

[75] Inventors: Peter J. Schreiner; Bert A. Gumkowski, both of South Bend, Ind.

[73] Assignee: The Bendix Corporation, Southfield, Mich.

[21] Appl. No.: 445,264

[22] Filed: Nov. 29, 1982

[51] Int. Cl.³ .................................... F16D 65/02
[52] U.S. Cl. ............................ 188/73.38; 188/73.36; 188/73.39
[58] Field of Search ............... 188/73.35, 73.36, 73.37, 188/73.38, 73.32, 73.39, 73.43; 192/30 V, 70.28, 109 B

[56] References Cited

U.S. PATENT DOCUMENTS

| 3,990,545 | 11/1976 | Hoffman et al. | 188/73.35 X |
| 4,044,864 | 8/1977 | Karasudani | 188/73.36 X |
| 4,056,174 | 11/1977 | Wienand et al. | 188/73.36 |
| 4,225,017 | 9/1980 | Op den Camp | 188/73.38 |
| 4,289,217 | 9/1981 | Heibal | 188/73.38 |
| 4,410,069 | 10/1983 | Schreiner et al. | 188/73.38 X |

FOREIGN PATENT DOCUMENTS

| 2354480 | 1/1978 | France | 188/73.36 |
| 74672 | 7/1978 | Japan | 188/73.39 |
| 2030251 | 4/1980 | United Kingdom . | |
| 2088500 | 6/1982 | United Kingdom | 188/73.38 |

Primary Examiner—Douglas C. Butler
Assistant Examiner—Robert J. Oberleitner
Attorney, Agent, or Firm—Paul David Schoenle; Ken C. Decker

[57] ABSTRACT

A wire spring (60) for a disc brake includes a coiled portion (62) with a pair of arms (64, 66) cooperating with the caliper via slots (70, 76) and with a friction element (24) via ends thereof (32, 34) in order to reduce rattle caused by the friction element while at the same time releasably attaching the friction element to the caliper assembly.

6 Claims, 3 Drawing Figures

U.S. Patent  Dec. 11, 1984  4,487,296
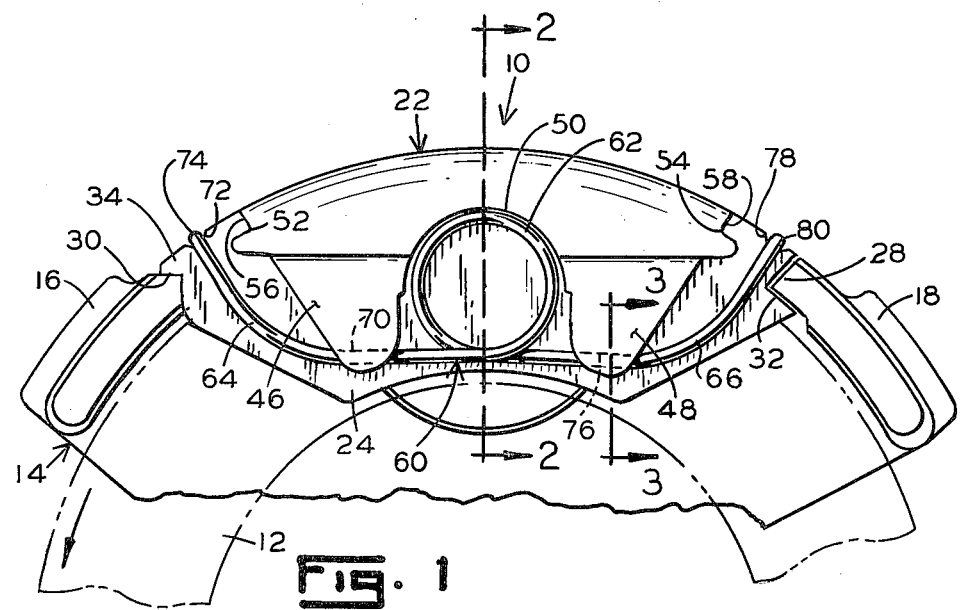
Fig. 1
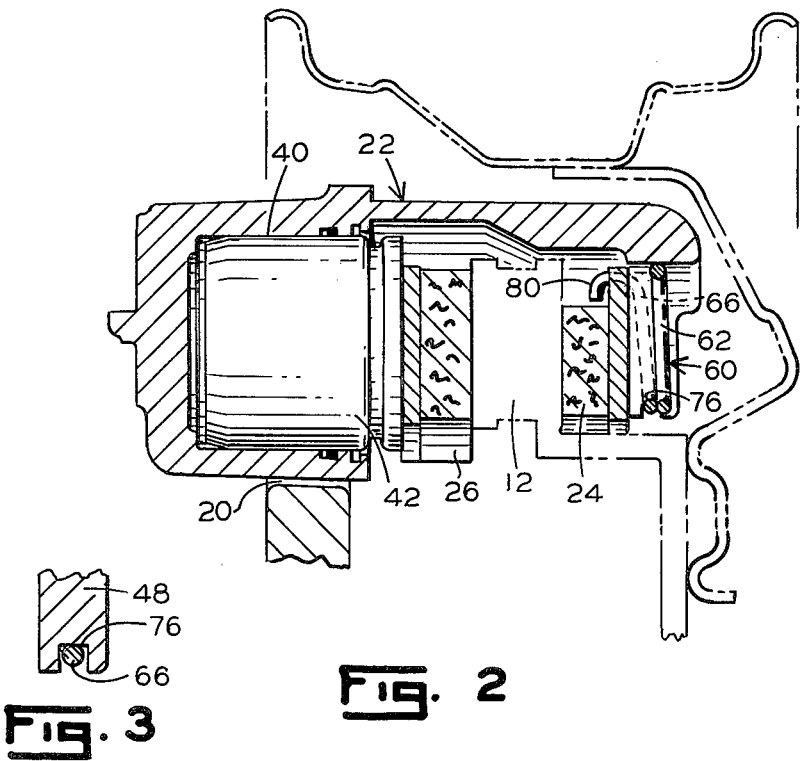
Fig. 2
Fig. 3

WIRE SPRING FOR A DISC BRAKE

This invention relates to a wire spring for a disc brake wherein a caliper assembly cooperates with a pair of friction pads to engage the latter with a rotor to be braked.

A wire spring for a disc brake wherein a caliper is movable axially relative to a torque member to engage at least one friction element with a rotor to be braked, the one friction element being engageable with the torque member and the caliper at opposite ends of the one friction element, the caliper defining a central recess intermediate a pair of legs opposing the one friction element to bias the latter into engagement with the rotor during braking, and the wire spring extending between the one friction element and the caliper to yieldably oppose separation therebetween.

A wire spring is illustrated in U.S. Pat. No. 4,082,166. In order for the wire spring to cooperate with one of the pair of friction elements, it is necessary for the one friction element to be provided with a tab and a flange. The wire spring then engages the tab and the flange to attach the one friction element to the caliper.

Another spring for a disc brake, although not in wire form, is shown in U.K. Patent Application No. 2,030,251 A, Application Ser. No. 7930917.

The present invention is characterized by said wire spring including a middle portion disposed within said central recess, a pair of arms extending from said middle portion and engageable with said opposite ends of said one friction element between said caliper and said torque member, and said pair of arms cooperate with said pair of caliper legs to define an axially interlocking connection substantially limiting axial movement between said wire spring and said caliper; said pair of arms further biasing said one friction element into engagement with said caliper whereby rattling is reduced.

It is an advantage of the present invention that the wire spring is shaped to connect with a caliper and a friction element with minimal modifications to either the friction element or the caliper, while at the same time permitting the wire spring to yieldably attach the friction element to the caliper.

The invention will now be described with reference to the accompanying drawings, wherein;

FIG. 1 is a side view of a disc brake provided with the wire spring of the present invention;

FIG. 2 is a cross-sectional view taken along line 2—2 of FIG. 1; and,

FIG. 3 is a cross-sectional view taken along line 3—3 of FIG. 1.

A disc brake 10 is disposed adjacent a rotor 12 to be braked. A torque member 14 defines a pair of supports 16 and 18 extending axially over the edge of a segment of the rotor 12. The supports define a circumferential spacing 20 therebetween in order to receive a caliper assembly 22 and a pair of friction elements 24 and 26. During braking the caliper assembly is movable relative to the torque member in an axial direction to move the pair of friction elements into engagement with the rotor in a conventional manner.

The support 18 defines a V-shaped abutment 28 while the support 16 defines a L-shaped abutment 30. The friction element 24 is recessed at opposite ends at 32 and 34 such that the end 32 matches with the V-shaped abutment 28 and the end 34 matches with the L-shaped abutment 30. With forward rotation for the rotor being in a counterclockwise direction in FIG. 1, the friction element 24 vertically opposes the V-shaped abutment in an upward direction to prevent lifting of the friction element at the support 18. Correspondingly, the friction element vertically opposes the L-shaped abutment in a downward direction to prevent tilting of the friction element at the support 16.

The caliper assembly defines a bore 40 on one side of the rotor to receive a piston 42 which is movable in response to fluid pressure communicated to the bore 40. The caliper assembly further defines a reaction limb 44 opposite from the piston 42 and disposed on the other side of the rotor. The reaction limb 44 includes a pair of legs 46 and 48 with a central recess 50 therebetween. The central recess 50 permits a tool to extend into the bore 40 for the purpose of finishing of oppositely facing edges 52 and 54 are provided on the caliper assembly adjacent to and spaced from the supports 16 and 18, respectively. The edges 52 and 54 are V-shaped in cross section so that flanges 56 and 58 on the friction element 24 extend into the grooves formed by the V-shaped edges.

In accordance with the invention, a wire spring 60 includes a middle portion 62 with a pair of arms 64 and 66 extending from the middle portion. The middle portion 62 comprises a coil which is fitted within the central recess 50 and in engagement with the wall thereof. The arm 64 extends outwardly from the coil 62 to fit within a slot 70 on leg 46 and extend further between the support 16 and the leg 46 to engage the end 34 via a recess 72. The engagement is enhanced by a hook 74 integrally formed by the wire spring arm 64 at the end thereof. In a similar manner, the arm 66 extends outwardly from the coil to fit within a slot 76 on the leg 48 and extend further between the support 18 and the leg 48 to engage the end 32 via a recess 78. A hook 80 is formed integrally by the wire arm 66 at the end thereof to fit in the recess 78.

In order to attach the wire spring to the friction element 24 and the caliper assembly 22, the friction element 24 is positioned on the caliper so that the flanges 56 and 58 fit within the edge grooves 52 and 54, respectively and the friction element is adjacent the legs. Next, the coil 62 is disposed within the central recess, so that the arms 64 and 66 are fitted in the slots 70 and 76, respectively. At the same time, the arms 64 and 66 are also bent upwardly about the slots in order to position each hook 74 and 80 in alignment with the recesses 72 and 78. As a result, the friction element 24 is biased downwardly viewing FIG. 1, so that the flanges 56 and 58 tightly abut the lower portions of the grooves 52 and 54 thereby reducing the possibility of rattle between the friction element 24 and the caliper assembly 22. The friction element 24 is also restricted from axial movement within the grooves because the arms 64 and 66 are yieldably trapped in the slots and the hooks resiliently oppose axial movement of the friction element 24 relative to the arms in the direction of the piston.

It is seen from the foregoing description, that the wire spring fits within a central recess 50 and extends between a circumferential spacing between the caliper legs 46, 48 and the supports 16, 18. This arrangement for the wire spring substantially eliminates modification of the caliper assembly and the supports while at the same time being easily accessible for assembly removal and reinstallation. In addition, the wire form of the wire spring enables one skilled in the art to provide a disc brake spring which is believed to be easily manufactured at relatively minimal cost. The wire spring is readily fitted to the caliper assembly and friction element.

We claim:

1. A wire spring for a disc brake wherein a caliper is movable axially relative to a torque member to engage at least one friction element with a rotor to be braked, the one friction element being engageable with the torque member and the caliper at opposite ends of the one friction element, the caliper defining a central recess intermediate a pair of legs opposing the one friction element to bias the latter into engagement with the rotor during braking, and the wire spring extending between the one friction element and the caliper to yieldably oppose separation therebetween, characterized by said wire spring including a middle portion disposed within said central recess, a pair of arms extending from said middle portion and engagable with said opposite ends of said one friction element between said caliper and said torque member, said pair of arms cooperate with said pair of caliper legs to define an axially interlocking connection substantially limiting axial movement between said wire spring and said caliper, said pair of arms further biasing said one friction element into engagement with said caliper whereby rattling is reduced, and said wire spring middle portion engages the wall of said central recess and said pair of arms engage said one friction element to bias the latter radially inwardly into engagement with said caliper.

2. The wire spring of claim 1 in which each of said pair of legs define slots receiving said pair of arms, respectively.

3. The wire spring of claim 1 in which said middle portion defines a loop for said wire spring.

4. The wire spring of claim 1 in which the ends of said pair of arms define hooks and said one friction element defines a pair of grooves receiving said pair of hooks, respectively.

5. The wire spring of claim 1 in which said pair of arms extend radially outwardly adjacent said one friction element within a circumferential spacing between said torque member and said pair of legs.

6. The wire spring of claim 1 in which said interlocking connection includes an axial and a radial component.

* * * * *